(No Model.)

J. F. J. GUNNING.
GAGE FOR SETTING SEWING MACHINE GUIDES.

No. 258,056. Patented May 16, 1882.

Witnesses:
J. H. Shumway
Jos. A. Earle

Jas. F. J. Gunning, Inventor
By atty.
John A. Earle

UNITED STATES PATENT OFFICE.

JAMES F. J. GUNNING, OF NEW HAVEN, CONNECTICUT.

GAGE FOR SETTING SEWING-MACHINE GUIDES.

SPECIFICATION forming part of Letters Patent No. 258,056, dated May 16, 1882.

Application filed March 30, 1882. (No model.)

*To all whom it may concern:*

Be it known that I, JAMES F. J. GUNNING, of New Haven, in the county of New Haven and State of Connecticut, have invented a new Improvement in Gages for Setting Sewing-Machine Guides; and I do hereby declare the following, when taken in connection with accompanying drawings and the letters of reference marked thereon, to be a full, clear, and exact description of the same, and which said drawings constitute part of this specification, and represent, in—

Figure 1:
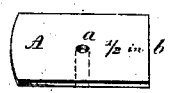
Figure 2:
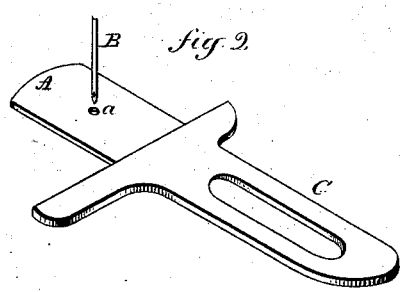
Figure 3:
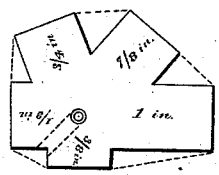

Figure 1, a perspective view. Fig. 2 illustrates the use of the gage; Fig. 3, a modification.

This invention relates to an improvement in device for setting the guides of sewing-machines.

In manufactories where numerous persons are employed to run sewing-machines, and where a nicety of work is desirable, a great difficulty is experienced arising from the improper setting of guides. Particularly is this the case in corset-work, where accurate measurement between the edge of the guide and the needle is very important, because a little variation on one seam makes great variation in the whole part. This difficulty arises from the fact that operatives do not understand measurement. They are each furnished with a measure of sufficient length for all practical purposes, graduated in inches and fractional parts thereof; but with this measure no equality of work can be obtained from numerous operatives.

The object of my invention is to provide a guide which will in itself indicate the position of the needle and of the guide, so that no mistake can be made as to their proper relation to each other; and it consists in a plate having a recess or aperture for the needle, and an edge distant therefrom according to the distance required for the guide, so that the plate or gage placed upon the needle, the guide may be brought into contact with the edge of the gage and there set without requiring any measurement on the part of the operative, as more fully hereinafter described.

A single gage is illustrated in Fig. 1. This consists of a thin plate, A, of metal, having a perforation, *a*, through which the needle will pass, and distant from the edge *b* according to the distance which is required for the guide—supposed in this case to be one-half inch. This plate is placed upon the work-plate, the needle B passed down through the aperture *a*, as seen in Fig. 2, and then the guide brought up against the edge of the plate and there secured; then the gage may be removed.

The gage may be marked to indicate the distance, or it may be marked with a number or a letter, so that the mark shall indicate the particular gage, gages of other sizes being marked accordingly, so that an operative, when directed to set a guide, has simply to be told which gage to use in doing so.

By this device acquaintance with measures is unnecessary, and accuracy is insured, because both the position of the needle and of the guide is positively indicated by the gage.

The aperture for the needle may be cut through to the edge, as indicated in broken lines, Fig. 1, so that the gage will pass on over the needle when down and prevent the possibility of injuring the point in passing through the gage, yet a countersunk aperture will accomplish a very good purpose.

Several gages may be combined in one, as seen in Fig. 3, each branch having its own distinctive mark, or it may be in the form of a disk polygonal in shape, as indicated by the broken lines, Fig. 3, but singly there is no liability to mistake one gage for another, as might sometimes be the case where several are combined in one.

I claim—

The herein-described gage for setting the guide of sewing-machines, consisting of the plate A, constructed with an aperture through which the needle will pass, and an edge, *b*, distant from the aperture according to the relative position required for the guide, substantially as described.

JAS. F. J. GUNNING.

Witnesses:
JOHN E. EARLE,
JOS. C. EARLE.